R. W. GREENBERG
SHEARS.
APPLICATION FILED JAN. 17, 1919.
1,368,431.
Patented Feb. 15, 1921.
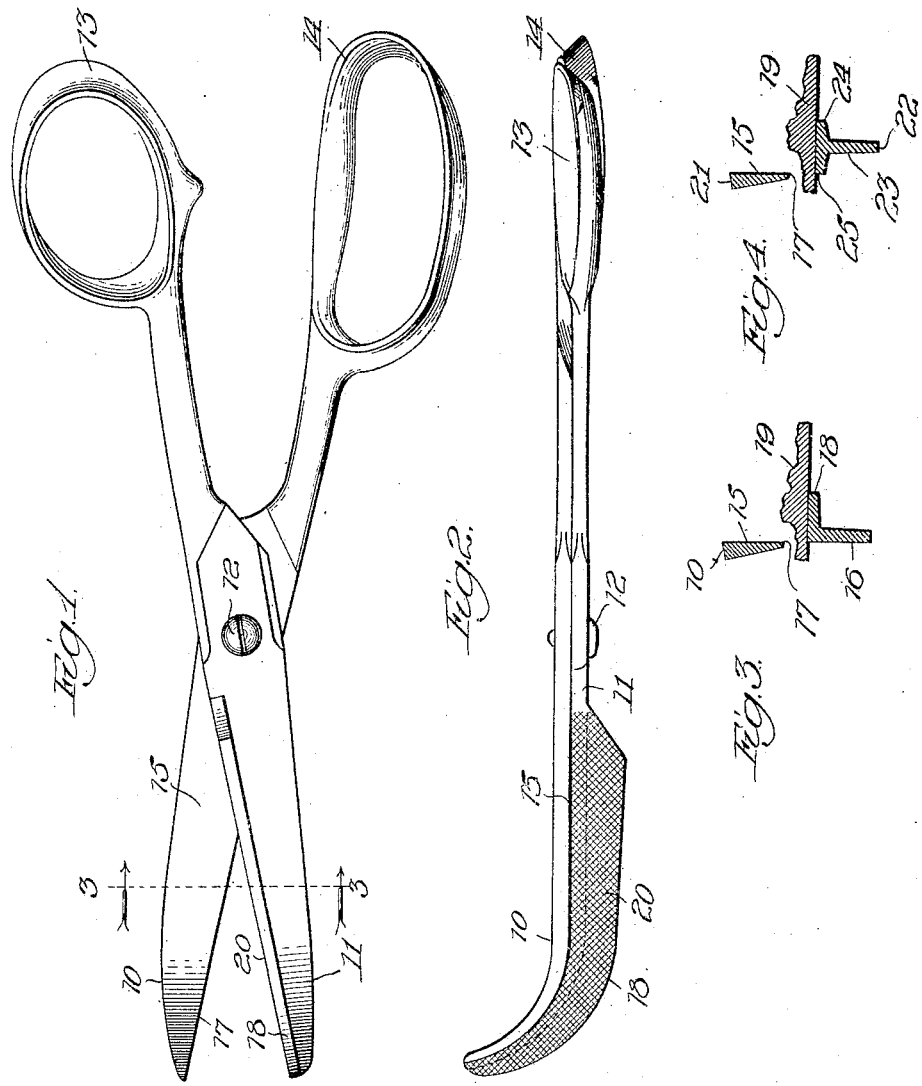

UNITED STATES PATENT OFFICE.

ROBERT W. GREENBERG, OF NEW YORK, N. Y.

SHEARS.

1,368,431.  Specification of Letters Patent.  Patented Feb. 15, 1921.

Application filed January 17, 1919. Serial No. 271,685.

*To all whom it may concern:*

Be it known that I, ROBERT W. GREENBERG, a citizen of the United States, residing at New York, in the county and State of New York, have invented new and useful Improvements in Shears, of which the following is a specification.

This invention relates to dental or other shears.

Among the objects of my invention is to provide one of the blades of the shears with a laterally projecting flange extending substantially the full length of the blade, for forming a platform for supporting the material while being cut or trimmed by the other blade. The shears of my invention are particularly adapted for use by dentists for cutting or trimming dental or like models made of plaster of Paris or other similar material.

In the accompanying drawings—

Figure 1 is a side elevational view of a pair of shears embodying the features of my invention;

Fig. 2 is a top plan view of the shears;

Fig. 3 is a transverse sectional view, taken on line 3—3 of Fig. 1; and

Fig. 4 is a like view and illustrating the platform on one of the blades formed in a manner different from that shown in said Fig. 3.

The pair of shears shown in the drawings comprises two blades 10, 11, pivoted together by a screw 12 and provided with handles 13, 14. The inner faces 15, 16 of the blades move in the same plane, and the inner edge 17 of the blade 10 is a knife-edge and constitutes the cutting edge of said blade. The other blade 11 is not provided with a cutting edge, it has a laterally projecting flange 18 extending substantially the full length of the blade from adjacent the screw 12 to the outer end thereof, as shown in Figs. 1 and 2. Said flange 18 is arranged transverse to the plane of movement of the blades, and forms on the blade 11 a platform for supporting the material, such as 19, while being cut by the blade 10. Said flange 18 has its supporting surface 20 made substantially flat and meeting the flat inner face 16 of the blade 11 in that inner edge of said blade past which the cutting edge 17 of the blade 10 moves. Said surface 20 may be roughened, as shown in Fig. 2, so as to have a better grip on the material and hold the same from slipping while being cut by the other blade 10. In the type of shears shown in Figs. 1 to 3, the flange 18 is made integral with the body portion of the blade 11, and the latter, by reason of said flange, is L-shaped in cross-section. In Fig. 4, I have shown another way in which a supporting platform may be formed on one of the blades. As illustrated in said figure, there are two blades 21, 22, the former being made exactly like the blade 10. The blade 22 is provided with a body portion or rib 23 extending the full length of the blade and having a flange 24 extending across the upper end of the same, as shown, so as to make the blade 23 T-shaped in cross-section. The inner face 25 of said flange 24 constitutes that inner face of said blade 22 which is in the same plane as the inner face 15 of the blade 21. Whether the platform is made as in Fig. 3 or in Fig. 4, the platform is arranged transverse to the other blade and projects laterally therefrom, so that such platform will serve as a support or rest for the material while being cut by the cutting edge 17 of the other blade, there being no projection on the cutting blade to impinge against any part of the material on the platform in the moving of the blades together during the cutting operation. The blades may have their outer ends curved, as shown.

The shears of my invention are particularly applicable for use in dental work for cutting or trimming plaster of Paris dental models and similar parts. It has been the practice heretofore to use an ordinary knife for such purpose, with the result that the fingers of the hand of the dentist are cut and roughened and are readily and quickly soiled by the kind of material being operated upon. With my improved shears, however, the model or other part to be cut or trimmed may be rested or supported on the platform of one of the blades and held by one hand on such platform while the other hand is used to operate the shears to cut the part so held. The result is that the hands are away from the cutting edge of the shears and are therefore free from being cut and roughened in the cutting operation, and are not soiled by the material being cut. Furthermore. with the shears it is possible to gain sufficient leverage to cut the material. In the drawings, I have shown, for the purpose of illustration, a dental or other model 19 made of plaster of Paris or similar material and resting on the platform of one of the blades of the shears and in position to be cut or trimmed by the cutting edge of the other blade, and it will be noted that the model rests on the platform during the cutting operation. It is possible with said shears to cut larger pieces of material much more rapidly and thereby gain a saving of time.

I claim as my invention:

1. A hand implement for cutting or trimming dental models of plaster or like material, comprising upper and lower members pivoted together intermediate their ends and having handles at their inner ends by which said implement may be held in one hand and said members moved toward and from each other, said upper member having a cutting edge, and a flange of substantial width on the lower member for supporting a dental model while being cut or trimmed by the upper member and extending along a substantial portion of said lower member between the pivot and the outer end thereof, said flange being substantially at right angles to the plane of movement of the upper member, the inner edge of the flange constituting the inner edge of the lower member and lying in the plane of the supporting surface of the flange.

2. A hand implement for cutting or trimming dental models of plaster or like material, comprising upper and lower members pivoted together intermediate their ends and having handles at their inner ends by which said implement may be held in one hand and said members moved toward and from each other, said upper member having a cutting edge, said lower member having two integral flanges arranged at right angles to each other and one of said flanges being of substantial width and arranged at right angles to the plane of movement of the upper member for supporting a dental model while being cut or trimmed by the upper member, said supporting flange extending between the pivot and the outer end of said lower member, the inner edge of said supporting flange constituting the inner edge of the lower member and lying in the plane of the supporting surface of the flange.

In testimony that I claim the foregoing as my invention, I affix my signature in the presence of two witnesses, this 31 day of December, A. D. 1918.

ROBERT W. GREENBERG.

Witnesses:
H. A. WELLIKOFF,
OTTO W. GREENBERG.